United States Patent
Montes Linares

(10) Patent No.: US 7,450,589 B2
(45) Date of Patent: Nov. 11, 2008

(54) ADMISSION CONTROL AND RESOURCE RESERVATION FOR A GUARANTEED QUALITY OF SERVICE

(75) Inventor: Héctor Montes Linares, Granada (ES)

(73) Assignee: Nokia Corporation, Espoo (FI)

( * ) Notice: Subject to any disclaimer, the term of this patent is extended or adjusted under 35 U.S.C. 154(b) by 983 days.

(21) Appl. No.: 10/448,440

(22) Filed: May 30, 2003

(65) Prior Publication Data

US 2004/0202180 A1    Oct. 14, 2004

(30) Foreign Application Priority Data

Apr. 11, 2003    (EP)    ................................. 03008495

(51) Int. Cl.
*H04L 12/28* (2006.01)
*H04L 12/56* (2006.01)
*H04Q 7/00* (2006.01)
*H04Q 7/28* (2006.01)

(52) U.S. Cl. .................... 370/395.2; 370/468; 370/329; 370/341

(58) Field of Classification Search ................. 370/468, 370/395.2, 328, 329, 341
See application file for complete search history.

(56) References Cited

U.S. PATENT DOCUMENTS

| | | | |
|---|---|---|---|
| 6,999,421 B1 * | 2/2006 | Holzworth et al. | ........... 370/235 |
| 7,016,375 B1 * | 3/2006 | Rosenberg et al. | ........... 370/468 |
| 2002/0003783 A1 * | 1/2002 | Niemela et al. | ............ 370/329 |

OTHER PUBLICATIONS

Fletcher, Flexible Telecommunications System Architecture, Oct. 2000.*

* cited by examiner

*Primary Examiner*—Ronald Abelson
(74) *Attorney, Agent, or Firm*—Squire, Sanders & Dempsey L.L.P.

(57) ABSTRACT

A method and system guarantees a certain throughput on the Abis interface of the base station for real time traffic. The method includes the steps of providing an admission control and resource reservation for radio resources; providing an admission control for the Abis interface by determining the used resources of the Abis interface, determining the needed resources for a desired throughput of a connection, and accepting the connection if the amount of the needed Abis resources is smaller than the difference between the available Abis resources and the used Abis resources; and utilizing the results of the admission control for the Abis interface as network design parameters for providing a resource reservation for Abis resources.

20 Claims, 2 Drawing Sheets

ADMISSION CONTROL AND RESOURCE RESERVATION FOR A GUARANTEED QUALITY OF SERVICE

BACKGROUND OF THE INVENTION

1. Field of the Invention

The invention relates to a method and system for providing admission control and resource reservation for a guaranteed Quality of Service. Particularly, the invention relates to a method and system for guaranteeing a certain throughput on the Abis interface for real time traffic.

2. Description of the Related Art

In an (Enhanced) General Packet Radio System (GPRS) network, one of the problems for supporting services requiring a guaranteed throughput like multimedia streaming services which in general is a real time traffic resides in the admission control of a new connection request. This applies even more, since this connection request is different depending on the traffic characteristic, i.e. whether it is a real time connection or a non real time connection.

Specifically, many of the services which are typically requested by users require a certain amount of Quality of Service (QoS) so that it is necessary to guarantee such requirements. In particular, a certain throughput is desired for these services.

Previously, before the Base Station Subsystem (BSS) was able to provide Guaranteed Bite Rate (GBR) services, the network admitted a new Temporary Block Flows (TBF) establishment request until the number of TBF per timeslot (TSL) was up to eight.

Later, an admission control (AC) and resource reservation (RR) of radio resources which were able to guarantee a certain bit-rate for streaming connections on GPRS shared channels was proposed.

SUMMARY OF THE INVENTION

However, though these admission control (AC) mechanisms have been proposed for that purpose in actual GPRS networks, these mechanisms just take into account the radio resources, while the limitations in these conventional systems may come from the scarce EGPRS Dynamic Abis Pool (EDAP) resources. The invention recognizes that the conventional management of the Dynamic Abis Pool, i.e. the pool of resources for the interface between the Base Transceiver Station (BTS) and the Base Station Controller/Transcoder and Rate Adapter Unit (BSC/TRAU) which is used by GPRS traffic, does not include an admission control and resource reservation scheme so far. Therefore, the invention provides a system and method that guarantees that the negotiated guaranteed bit-rate (GBR) can be provided for real time traffic from Gb to Um interfaces.

Specifically, the invention provides a method of guaranteeing a certain throughputt on the Abis interface of the base station subsystem for real time traffic. The method includes the steps of providing an admission control and resource reservation for radio resources; providing an admission control for the Abis interface by determining the used resources of the Abis interface, determining the needed resources for a desired throughput of a connection, and accepting the connection if the amount of needed Abis resources is smaller than the difference between the available Abis resources and the used Abis resources; and utilizing the results of the admission control for the Abis interface as network design parameters for providing a resource reservation for Abis resources.

The needed resources for a desired throughput of a connection can be determined for the downlink direction by dividing the guaranteed bit-rate by the throughput depending upon a used modulation and coding scheme and multiplying a respective result with the number of slaves depending upon the used modulation and coding scheme, and for the uplink direction by dividing the guaranteed bit-rate by the product of the throughput depending upon a used modulation and coding scheme and the difference to one of a block error rate and multiplying a respective result with the number of slaves depending upon the used modulation and coding scheme.

The modulation and coding scheme parameter can be obtained by assuming a given type of channel, setting the value of a parameter Throughput_per_TSL by an operator of the system, and obtaining the expected modulation and coding scheme parameter from respective mapping tables.

The block error rate parameter can be obtained by obtaining the required capacity per interface value from the respective mapping tables, and utilizing the required capacity per interface value and the expected modulation and coding scheme parameter.

The used resources of the Abis interface can be determined by monitoring, using a scheduler, an actual average number of slaves needed per radio block for temporary block flows; monitoring, using the scheduler, an actual average bit-rate per radio block for the temporary block flows; calculating a used radio capacity from the actual average bit-rate per radio block for the temporary block flows; and calculating the used resources of the Abis interface by multiplying the used radio capacity by the average number of slaves per block.

In an alternative embodiment, the used resources of the Abis interface can be determined by providing an estimation therefor from a link adaptation algorithm based on a commanded modulation and coding scheme and an estimation for the block error rate on the basis of bit error probability measurements for an ongoing connection.

The invention also provides a system for guaranteeing a certain throughput on the Abis interface of the Base Station Subsystem for real time traffic. The system includes a device for providing an admission control and resource reservation for radio resources; a device for providing an admission control for the Abis interface by including means for determining the used resources of the Abis interface, means for determining the needed resources for a desired throughput of a connection, and means for accepting the connection if the amount of needed Abis resources is smaller than the difference between the available Abis resources and the used Abis resources; and a device for utilizing the results of the admission control for the Abis interface as network design parameters provided to a device for providing a resource reservation for Abis resources.

Further, the invention also provides a network device for providing admission control for the Abis interface of the Base Station Subsystem for real time traffic. The network device includes means for determining the used resources of the Abis interface, means for determining the needed resources for a desired throughput of a connection, and means for accepting the connection if the amount of needed Abis resources is smaller than the difference between the available Abis resources and the used Abis resources.

That is, according to the invention, an admission control and resource reservation of both radio and EDAP resources is provided for real time traffic such as streaming, which requires a guaranteed throughput as a certain Quality of Service. Hence, it is possible to guarantee a certain bit-rate.

BRIEF DESCRIPTION OF THE DRAWINGS

These and other advantages, modifications, and details of the invention will become even more readily apparent from the following detailed description of the preferred embodiments which is to be taken in conjunction with the appended drawings, in which.

DETAILED DESCRIPTION OF THE PREFERRED EMBODIMENTS

In the following, a description of the invention is given by making reference to a (E)GPRS system, but the invention is not limited to the description provided herein. Accordingly, the invention may as well be applied to systems with similar characteristics with respect to the radio resources as is to be understood from the following description of the preferred embodiments of the invention.

Figure 1:
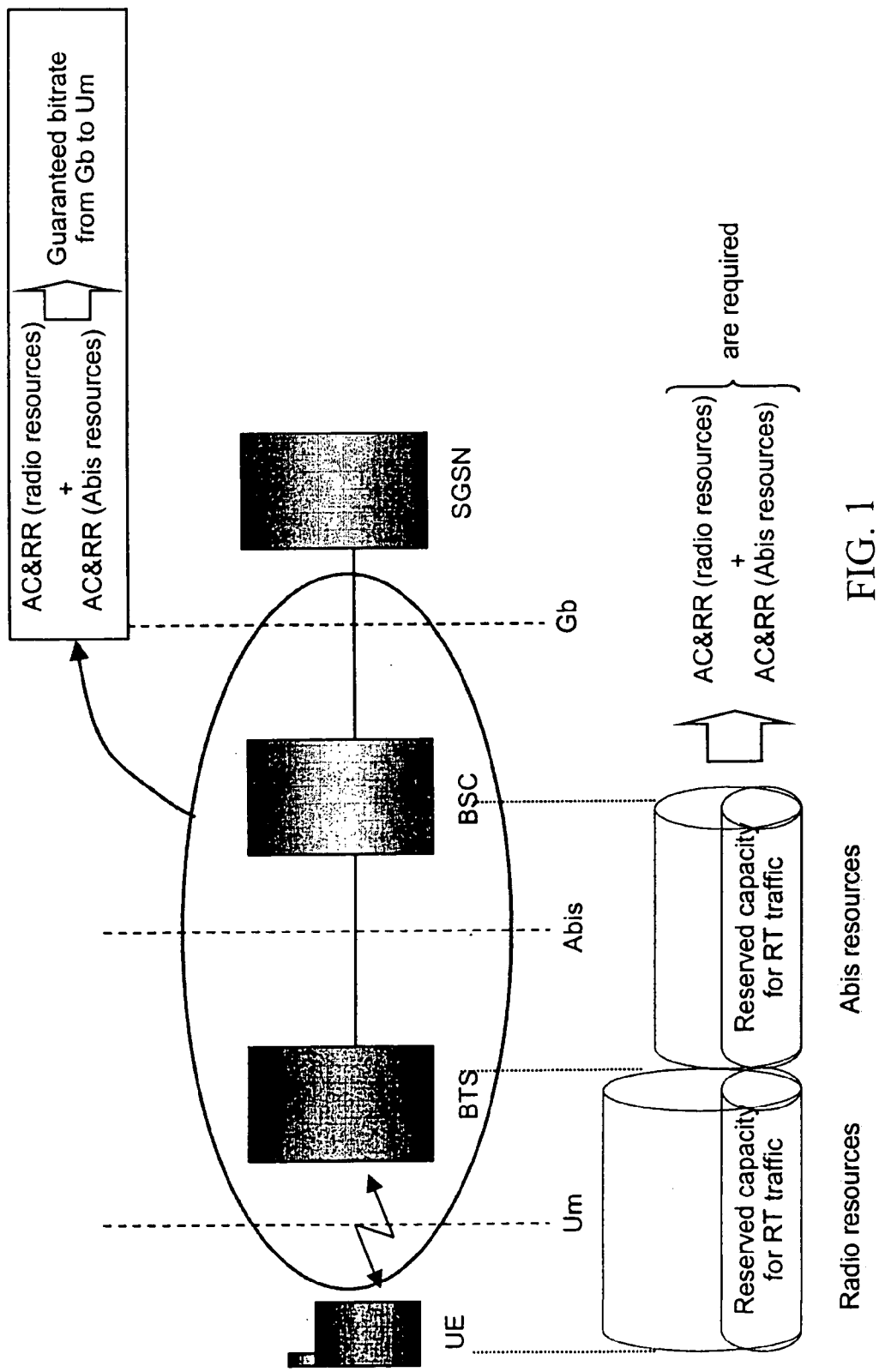
FIG. 1 shows the architecture of the system for emphasizing the need for admission control and resource reservation of both the radio resources and EDAP resources.

First, reference is made to FIG. 1 which shows the architecture of those parts of the system which are mainly affected by the invention. That is, a user equipment UE can connect to a Base Transceiver Station BTS via the Um interface (the radio air interface). The Base Transceiver Station BTS in turn is connected to the Base Station Controller BSC via the Abis interface, both the Base Transceiver Station BTS as well as the Base Station Controller BSC being part of the Base Station Subsystem (BSS—depicted by the ellipse). Finally, the interface Gb is the connection between the Base Station Controller BSC and the Serving GPRS Support Node SGSN.

As described above, the support of services that require some guarantees in (E)GPRS networks means that the Base Station Subsystem BSS needs to guarantee a certain Quality of Service in terms of the data throughput. This in turn means that if some guarantees are needed, then a radio resource reservation is required.

The admission control (AC) can be used to calculate what network resources are required to provide the requested Quality of Service (QoS), to determine if the resources are available, and to reserve them.

In a GPRS network, the Abis interface can become the bottleneck of the system, since its resources (called EGPRS Dynamic Abis Pool (EDAP) resources) are quite scarce. Therefore, in addition to the admission control (AC) and resource reservation (RR) of radio resources (which are the resources of the Um interface, as shown in FIG. 1), the invention also recognizes that an admission control and resource reservation of EDAP resources also need to be provided.

These EDAP resources are sub-channels at 16 kbps within a 64 kbps pulse code modulation (PCM) channel belonging to the EDAP (EGPRS Dynamic Abis Pool). They are also called "slave" channels or shortly "slaves".

Hereinafter, a short example is given.

In the Base Station Controller (BSC), there are separate territories for the GPRS and EGPRS. In other words, the GPRS traffic primarily uses non-EDGE transceiver (TRX) and the EGPRS traffic uses EDGE transceiver (TRX). In a GPRS load situation or when a GPRS territory does not exist, it is possible that the GPRS traffic (GPRS Temporary Block Flows—TBF) uses a EGPRS capacity from the EGPRS territory.

When a GPRS Temporary Block Flow (TBF) takes place via GPRS territory (via a non-EDGE TRX), the CS-2 coding scheme needs only 16 kbit/s from the Abis interface resources, in this example. Therefore, one sub-timeslot from the fixed "pool" of Abis resources (i.e. a 16 kbps channel) is used.

When a GPRS Temporary Block Flow (TBF) takes place via EGPRS territory (via an EDGE TRX), the CS-2 coding scheme needs a 16 kbit/s master Abis channel and one 16 kbit/s slave channel from the EDAP. This is because the EDGE transceiver (TRX) uses different transcoder formats, rate adapter unit (TRAU) formats, and synchronization schemes. This means that master Abis channels and EDAP resources are only used by the EGPRS territory. The EDAP is not used by the GPRS territory.

That is, each EGPRS radio timeslot takes one master sub-timeslot from the fixed "pool" and four slave sub-timeslots (=one timeslot) from the EDAP.

According to the invention, an admission control approach for the GRPS Base Station Subsystem (BSS) is proposed. Thus, the admission control algorithm according to the invention takes into account the EDAP resources, treating in a different way the Non Real Time and Real Time traffic.

The EDAP admission control is applied to Real Time connections (i.e. streaming and conversational traffic class connections) and is based on the calculation of the use of the timeslot (TSL) (in percentage of time) needed for guaranteeing a certain bit-rate. Afterwards, it is checked whether the available capacity, i.e. the total estimated capacity minus the capacity used by ongoing connections, is larger than the needed capacity or not. According to the result, a connection is accepted or not. For a total acceptance, the radio admission control has to accept the connection, likewise based on the availability of resources as needed.

Needed EDAP capacity

Since the channel capacity seen by a particular connection is not known in a GPRS system at the time of connection establishment, an estimation is required. Thus, the translation from the bit-rate requirements into a percentage of time is carried out by means of an estimation of the channel capacity.

For the radio admission control, a parameter called "Throughput_per_TSL" is used, which stands for the throughput achieved per timeslot (TSL) with a given probability, e.g. X kbps/TSL with Y % of probability. This is a fixed value stored into the network. The operator therefore designs the network in order to achieve this throughput.

In contrast thereto, the EDAP admission control needs an estimation about the needed capacity in the Abis interface. This however cannot be derived from the "Throughput_per_TSL" parameter, because the amount of Abis resources required for sending a given amount of data depends on one hand on the Modulation and Coding Scheme (MCS) used in the network. The reason therefor is that basically, the size of the data payload on radio link control (RLC) blocks depends on the MCS. On the other hand, there is a dependency on the number of re-transmissions which is expressed by the parameter Block Error Rate (BLER), where a block refers to a RLC (Radio Link Control) block.

If these are known, the needed EDAP capacity can be calculated as follows (DL refers to the downlink direction, while UL refers to the uplink direction):

$$\text{Needed\_DL\_EDAP\_capacity} = \frac{GBR}{\text{Throughput}(MCS)} \cdot \text{number\_of\_slaves}(MCS) \quad (1)$$

-continued $$\text{Needed\_UL\_EDAP\_capacity} = \frac{GBR}{\text{throughput}(MCS) \cdot (1 - BLER)} \cdot \text{number\_of\_slaves}(MCS) \quad (2)$$

Accordingly, equations (1) and (2) present a determination of the amount of EDAP resources, i.e. the number of slave channels, that needs to be reserved to guarantee a given bit-rate GBR. Hence, it has to be calculated how many bits the Packet Control Unit (PCU) is sending to the Base Transceiver Station (BTS) (presented by the parameter "throughput (MCS)") in order to be able to know the number of channels needed for transmitting the GBR (in kbps).

That is, the "MCS" and "BLER" are the input parameters which are used by the admission control to determine the respective parameters "Needed EDAP capacity".

The parameters MCS and BLER can be calculated from the radio admission control parameters as follows.

In order to harmonize the EDAP admission control for the Abis interface with the existing radio admission control for the radio resources, according to one embodiment of the invention, use is made of the operator parameter of the radio admission control "Throughput_per_TSL" in order to derive the parameters MCS and BLER of the EDAP admission control.

Figure 2:
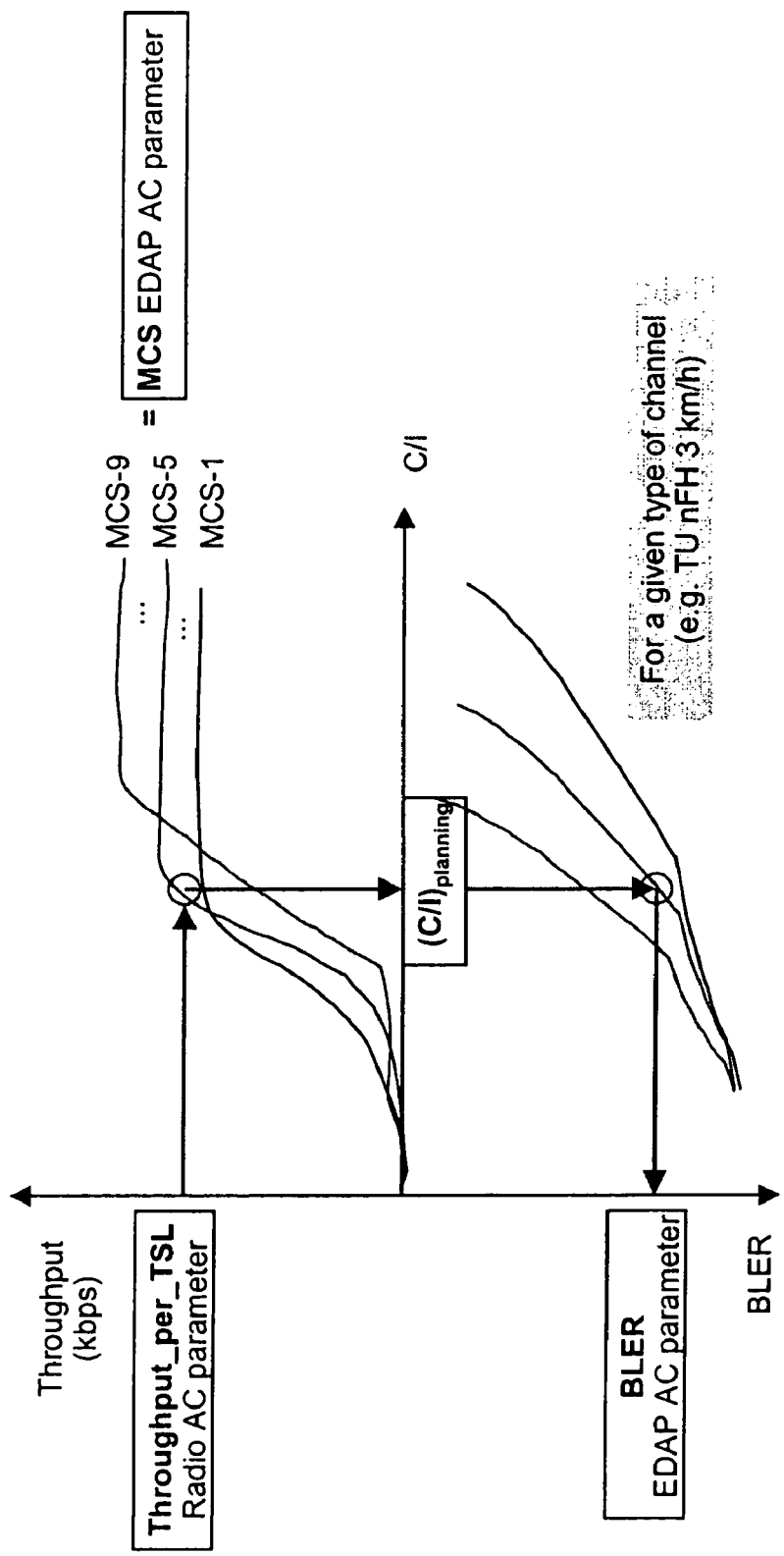
FIG. 2 shows functions of parameters as utilized according to the invention in comparison to the capacity per interface.

By referring to FIG. 2, this is effected by assuming a given type of channel. In this manner, the operator sets the value of "Throughput_per_TSL", and from the mapping tables (which of course are different for GPRS and EGPRS cases) it is possible to obtain the expected MCS parameter and the required C/I value to be used in the network design process, i.e. to be used as operator parameters. In addition, if the C/I value and the MCS parameter are known, it is possible to obtain the expected BLER parameter. Accordingly, the operator only has to set one parameter to configure both the radio as well as the EDAP admission control.

That is, FIG. 2 indicates how many slaves the guaranteed throughput requires in average. It is assumed that in case of the downlink (DL) direction, all the re-transmissions can be performed from the Base Transceiver Station (BTS) buffer so that no Abis resources are used. Whereas, in the uplink (UL) direction the Abis resources need to be reserved for the re-transmissions, too.

In FIG. 2, the illustrated MCS parameter denote that at least the respectively depicted MCS can be used in the cell with a probability of Y %.

In the downlink (DL) case, the needed EDAP capacity depends mainly on the throughput, as that is exactly what has to be transmitted through the Abis interface. A lower MCS needs more radio blocks, but fewer slave channels per radio block, while a higher MCS needs more slaves per radio block, but the amount of needed radio blocks is lower.

However, there are great variations in the needed EDAP capacity for a fixed throughput due to the variations in the number of data bits in the slave frames for different Modulation and Coding Schemes (MCS). Presently, it appears that the MCS-5 uses the EDAP resources most effectively, while the MCS-2 and the MCS-2 appear to be the most ineffective ones. Therefore, it seems that the throughput alone cannot be used to estimate the needed EDAP capacity.

In the uplink (UL) case, also the EDAP resources needed by the re-transmissions have to be taken into account.

Used EDAP Capacity

The capacity used by already ongoing connections can be calculated on the basis of information received from a scheduler. The scheduler monitors the actual average number of slaves needed per radio block for the Temporary Block Flows (TBF) according to the following equation:

$$\text{Used\_EDAP\_capacity} = \text{Used\_radio\_capacity} \cdot \text{Ave\_number\_of\_slaves\_per\_block} \quad (3)$$

Similarly, the scheduler monitors the actual average bitrate per radio block for the Temporary Block Flows (TBF) to calculate the used radio capacity. This takes into account both the used MCS and the re-transmissions (BLER).

While the above is a preferred embodiment for determining the used EDAP capacity, another possibility is to utilize the Link Adaptation (LA) Algorithm in order to provide the estimations.

Specifically, the Link Adaptation (LA) algorithm knows the commanded MCS and is also able to make use of an estimation for the BLER parameter on the basis of Bit Error Probability (BEP) measurements for the ongoing connection. Accordingly, an estimation of the used capacity based thereon could be established.

However, it is remarked here that such estimations may not take into account e.g. if the actual MCS is lower than the commanded MCS due to lack of EDAP resources.

Therefore, the estimation on the basis of scheduler monitoring is probably more accurate.

Connection Acceptance

As stated above, the admission control procedure according to the invention determines the following parameters.
EDAP capacity
Needed EDAP capacity
Used EDAP capacity The EDAP capacity is a matter of the network design and thus known to the operator.

The needed EDAP capacity is calculated on the basis of the parameters MCS an d BLER which in turn are calculated by either taking them directly from the Link Adaptation (LA) algorithm, or by calculating them from the radio admission control parameters according to FIG. 2 and equation (1) or (2).

The used EDAP capacity is calculated on the basis of the used radio capacity which is either obtained from the Link Adaptation (LA) algorithm as presented in equation (3) or from scheduler monitoring.

According to the above, if the needed EDAP capacity is smaller then the difference between the available EDAP capacity and the used EDAP capacity, then the connection is accepted by the EDAP admission control. For a final acceptance of a connection, of course the radio admission control has to accept it as well.

All the algorithms and functions related to the admission control according to the invention can be implemented using software programs inside the control plane part, which controls the packets unit. For example, in actual releases they can be implemented like a block inside the Packet Control Unit (PCU). However, this is just an example of an implementation and by no means intended to be limiting.

Thus, what is described above is a method, system and network device for guaranteeing a certain throughput on the Abis interface of the base station subsystem for real time traffic. The method includes the steps of providing an admission control and resource reservation for radio resources; providing an admission control for the Abis interface by determining the used resources of the Abis interface, determining the needed resources for a desired throughput of a connection, and accepting the connection if the amount of needed Abis resources is smaller than the difference between the available Abis resources and the used Abis resources; and utilizing the results of the admission control for the Abis interface as network design parameters for providing a resource reservation for Abis resources.

While it has been described above what is presently considered as the preferred embodiments of the invention, it is to be understood that the given explanations are by no means intended to be limiting and that various changes and modifications may be made as apparent to the skilled person without deviating from the scope of the invention which is defined by the appended claims.

The invention claimed is:

1. A method comprising:
first providing an admission control and a resource reservation for radio resources;
second providing an admission control for an Abis interface by determining used resources of the Abis interface, determining needed resources for a desired throughput of a connection, and accepting the connection if an amount of needed Abis resources is smaller than a difference between available Abis resources and the used Abis resources; and
utilizing results of the admission control as network design parameters for providing a resource reservation for Abis resources,
wherein said second providing comprises providing the admission control by determining the needed resources for the desired throughput of a connection determined by,
for the downlink direction, dividing a guaranteed bit-rate by the desired throughput depending upon a used modulation and coding scheme and multiplying a respective result with a number of slaves depending upon the used modulation and coding scheme; and
for the uplink direction, dividing the guaranteed bit-rate by a product of the desired throughput depending upon the used modulation and the coding scheme and a difference to a block error rate and multiplying a respective result with the number of slaves depending upon the used modulation and coding scheme.

2. The method according to claim 1, wherein the dividing comprise dividing the guaranteed bit-rate using the modulation and coding scheme parameter obtained by:
assuming a given type of channel,
setting a value of a throughput achieved per timeslot parameter by an operator of a system, and
obtaining an expected modulation and coding scheme parameter from respective mapping tables.

3. The method according to claim 2, wherein the dividing comprises dividing the guaranteed bit rate, for the uplink direction using the modulation and the coding scheme and the difference to the block error rate parameter obtained by:
obtaining a required capacity per interface value from the respective mapping tables; and
utilizing the required capacity per interface value and the expected modulation and coding scheme parameter.

4. The method according to claim 1, wherein the second providing comprises providing the admission control by determining the used resources of the Abis interface determined by:
monitoring, by a scheduler, an actual average number of slaves needed per radio block for temporary block flows;
monitoring, by the scheduler, an actual average bit-rate per radio block for the temporary block flows;
calculating a used radio capacity from the actual average bit-rate per radio block for the temporary block flows; and
calculating the used resources of the Abis interface by multiplying the used radio capacity by the average number of slaves per block.

5. A method comprising:
first providing an admission control and a resource reservation for radio resources;
second providing an admission control for an Abis interface by determining used resources of the Abis interface, determining needed resources for a desired throughput of a connection, and accepting the connection if an amount of needed Abis resources is smaller than a difference between available Abis resources and the used Abis resources; and
utilizing results of the admission control as network design parameters for providing a resource reservation for Abis resources,
wherein the second providing comprises providing the admission control by determining the used resources of the Abis interface determined by providing an estimation from a link adaptation algorithm based on a commanded modulation and coding scheme and an estimation for a block error rate based on bit error probability measurements for an ongoing connection.

6. A system comprising:
a first device configured to provide an admission control and a resource reservation for radio resources;
a second device configured to provide an admission control for an Abis interface, the second device comprising a determiner configured to determine the used resources of the Abis interface, a determiner configured to determine needed resources for a desired throughput of a connection, and an accepting unit configured to accept the connection if an amount of needed Abis resources is smaller than a difference between available Abis resources and the used Abis resources; and
a third device configured to utilize results of the admission control as network design parameters which are provided to a device for providing a resource reservation for Abis resources,
wherein the determiner configured to determine the needed resources for a desired throughput of a connection includes
for the downlink direction, a first dividing unit configured to divide a guaranteed bit-rate by the desired throughput depending upon a used modulation and coding scheme and to multiply a respective result with a number of slaves depending upon the used modulation and coding scheme, and
for the uplink direction, a second dividing unit configured to divide the guaranteed bit-rate by a product of the desired throughput depending upon the used modulation and the coding scheme and a difference to the a block error rate and to multiply a respective result with the number of slaves depending upon the used modulation and coding scheme.

7. The system according to claim 6, wherein a modulation and coding scheme parameter is supplied by:
an assuming unit configured to assume a given type of channel;
a setting unit configured to set a value of a throughput achieved per timeslot parameter provided by an operator of the system, and a first obtaining unit configured to obtain an expected modulation and coding scheme parameter from respective mapping tables.

8. The system according to claim 7, wherein the block error rate parameter is supplied by:
a second obtaining unit configured to obtain a required capacity per interface value from the respective mapping tables, and
a utilizing unit configured to utilize the required capacity per interface value and the expected modulation and coding scheme parameter.

9. The system according to claim 6, wherein the determiner configured to determine the used resources of the Abis interface includes:
a first scheduler configured to monitor an actual average number of slaves needed per radio block for temporary block flows;
a second scheduler configured to monitor an actual average bit-rate per radio block for the temporary block flows;
a first calculator configured to calculate a used radio capacity from the actual average bit-rate per radio block for the temporary block flows; and
a second calculator configured to calculate the used resources of the Abis interface by multiplying the used radio capacity by the average number of slaves per block.

10. A system comprising:
a first device configured to provide an admission control and a resource reservation for radio resources;
a second device configured to provide an admission control for an Abis interface, the second device comprising a determiner configured to determine the used resources of the Abis interface, a determiner configured to determine needed resources for a desired throughput of a connection, and an accepting unit configured to accept the connection if an amount of needed Abis resources is smaller than a difference between available Abis resources and the used Abis resources; and
a third device configured to utilize results of the admission control as network design parameters which are provided to a device for providing a resource reservation for Abis resources,
wherein the determiner configured to determine the used resources of the Abis interface includes a provider configured to provide an estimation from a link adaptation algorithm based on a commanded modulation and coding scheme and an estimation for a block error rate based on bit error probability measurements for an ongoing connection.

11. An apparatus comprising:
a first determiner configured to determine used resources of an Abis interface;
a second determiner configured to determine needed resources for a desired throughput of a connection; and
an accepting unit configured to accept the connection if an amount of needed Abis resources is smaller than a difference between available Abis resources and the used Abis resources,
wherein the second determining unit includes
for the downlink direction, a first dividing unit configured to divide a guaranteed bit-rate by the desired throughput depending upon a used modulation and coding scheme and to multiply a respective result with a number of slaves depending upon the used modulation and coding scheme; and
for the uplink direction, a second dividing unit configured to divide the guaranteed bit-rate by a product of the desired throughput depending upon used modulation and the coding scheme and a difference to a block error rate and to multiply a respective result with the number of slaves depending upon the used modulation and coding scheme.

12. The apparatus according to claim 11, wherein a modulation and coding scheme parameter is supplied by:
an assuming unit configured to assume a given type of channel;
a setting unit configured to set the value of a throughput achieved per timeslot parameter provided by an operator of a system; and
a first obtaining unit configured to obtain the expected modulation and coding scheme parameter from respective mapping tables.

13. The apparatus according to claim 12, wherein the block error rate parameter is supplied by:
a second obtaining unit configured to obtain a required capacity per interface value from the respective mapping tables; and
a utilizing unit configured to utilize the required capacity per interface value and the expected modulation and coding scheme parameter.

14. An apparatus comprising:
a first determiner configured to determine used resources of an Abis interface;
a second determiner configured to determine needed resources for a desired throughput of a connection; and
an accepting unit configured to accept the connection if an amount of needed Abis resources is smaller than a difference between available Abis resources and the used Abis resources,
wherein the first determiner includes
a first scheduler configured to monitor an actual average number of slaves needed per radio block for temporary block flows;
a second scheduler configured to monitor an actual average bit-rate per radio block for the temporary block flows;
a first calculator configured to calculate a used radio capacity from the actual average bit-rate per radio block for the temporary block flows; and
a second calculator configured to calculate the used resources of the Abis interface by multiplying the used radio capacity by the average number of slaves per block.

15. An apparatus comprising:
a first determiner configured to determine used resources of an Abis interface;
a second determiner configured to determine needed resources for a desired throughput of a connection; and
an accepting unit configured to accept the connection if an amount of needed Abis resources is smaller than a difference between available Abis resources and the used Abis resources,
wherein the first determiner includes a provider configured to provide an estimation from a link adaptation algorithm based on a commanded modulation and coding scheme and an estimation for a block error rate based on bit error probability measurements for an ongoing connection.

16. An apparatus comprising:
first determining means for determining used resources of an Abis interface;
second determining means for determining needed resources for a desired throughput of a connection; and accepting means for accepting the connection if an amount of needed Abis resources is smaller than a difference between available Abis resources and the used Abis resources,
wherein the first determining means includes providing means for providing an estimation from a link adaptation algorithm based on a commanded modulation and coding scheme and an estimation for a block error rate based on bit error probability measurements for an ongoing connection.

17. A system comprising:
first providing means for providing an admission control and a resource reservation for radio resources;
second providing means for providing an admission control for an Abis interface, the second providing means including determining means for determining the used resources of the Abis interface, determining means for determining needed resources for a desired throughput of a connection, and accepting means for accepting the connection if an amount of needed Abis resources is smaller than a difference between available Abis resources and the used Abis resources; and
utilizing means for utilizing results of the admission control as network design parameters which are provided to a device for providing a resource reservation for Abis resources,
wherein the determining means for determining the needed resources for a desired throughput of a connection includes
for the downlink direction, a first dividing means for dividing a guaranteed bit-rate by the desired throughput depending upon a used modulation and coding scheme and for multiplying a respective result with a number of slaves depending upon the used modulation and coding scheme, and
for the uplink direction, a second means for dividing the guaranteed bit-rate by a product of the desired throughput depending upon the used modulation and the coding scheme and a difference to the a block error rate and for multiplying a respective result with the number of slaves depending upon the used modulation and coding scheme.

18. A system comprising:
first providing means for providing an admission control and a resource reservation for radio resources;
second providing means for providing an admission control for an Abis interface, the second providing means including determining means for determining the used resources of the Abis interface, determining means for determining needed resources for a desired throughput of a connection, and accepting means for accepting the connection if an amount of needed Abis resources is smaller than a difference between available Abis resources and the used Abis resources; and
utilizing means for utilizing results of the admission control as network design parameters which are provided to a device for providing a resource reservation for Abis resources,
wherein the determining means for determining the used resources of the Abis interface includes providing means for providing an estimation from a link adaptation algorithm based on a commanded modulation and coding scheme and an estimation for a block error rate based on bit error probability measurements for an ongoing connection.

19. A computer program, embodied on a computer-readable medium, the computer program controlling a computer to perform the following:
first providing an admission control and a resource reservation for radio resources;
second providing an admission control for an Abis interface by determining used resources of the Abis interface, determining needed resources for a desired throughput of a connection, and accepting the connection if an amount of needed Abis resources is smaller than a difference between available Abis resources and the used Abis resources; and
utilizing results of the admission control as network design parameters for providing a resource reservation for Abis resources,
wherein said second providing comprises providing the admission control by determining the needed resources for the desired throughput of a connection determined by
for the downlink direction, dividing a guaranteed bit-rate by the desired throughput depending upon a used modulation and coding scheme and multiplying a respective result with a number of slaves depending upon the used modulation and coding scheme; and
for the uplink direction, dividing the guaranteed bit-rate by a product of the desired throughput depending upon the used modulation and the coding scheme and a difference to a block error rate and multiplying a respective result with the number of slaves depending upon the used modulation and coding scheme.

20. A computer program, embodied on a computer-readable medium, the computer program controlling a computer to perform the following:
first providing an admission control and a resource reservation for radio resources;
second providing an admission control for an Abis interface by determining used resources of the Abis interface, determining needed resources for a desired throughput of a connection, and accepting the connection if an amount of needed Abis resources is smaller than a difference between available Abis resources and the used Abis resources; and
utilizing results of the admission control as network design parameters for providing a resource reservation for Abis resources,
wherein the second providing comprises providing the admission control by determining the used resources of the Abis interface determined by providing an estimation from a link adaptation algorithm based on a commanded modulation and coding scheme and an estimation for a block error rate based on bit error probability measurements for an ongoing connection.

* * * * *